US012607440B2

(12) United States Patent
Aoki

(10) Patent No.: US 12,607,440 B2
(45) Date of Patent: Apr. 21, 2026

(54) MEASURING TOOL ATTACHMENT COVER

(71) Applicant: MITUTOYO CORPORATION,
Kawasaki (JP)

(72) Inventor: Toshihiko Aoki, Kanagawa prefecture
(JP)

(73) Assignee: MITUTOYO CORPORATION,
Kawasaki (JP)

( * ) Notice: Subject to any disclaimer, the term of this
patent is extended or adjusted under 35
U.S.C. 154(b) by 670 days.

(21) Appl. No.: 17/903,534

(22) Filed: Sep. 6, 2022

(65) Prior Publication Data

US 2023/0075939 A1     Mar. 9, 2023

(30) Foreign Application Priority Data

Sep. 8, 2021    (JP) ................................. 2021-146526

(51) Int. Cl.
*G01B 3/20*          (2006.01)
*G01B 3/00*          (2006.01)
(52) U.S. Cl.
CPC .............. *G01B 3/20* (2013.01); *G01B 3/002*
(2013.01)
(58) Field of Classification Search
CPC . G01B 3/20; G01B 3/002; G01B 3/18; G01B
5/0014; G01B 5/0002; G01B 5/00; G01B
7/00

(Continued)

(56) References Cited

U.S. PATENT DOCUMENTS 2,222,336 A * 11/1940 Domellof ................. G01B 3/18
33/702
4,749,416 A * 6/1988 Greenspan ............. G01K 1/105
374/140

(Continued)

FOREIGN PATENT DOCUMENTS

JP       S62-148757 U     9/1987
JP        2593028         3/1997

(Continued)

OTHER PUBLICATIONS

Williams, R. K. et al. The effects of Cr2O3 and Fe2O3 additions on
the thermal conductivity of Al2O3. Journal of Applied Physics, vol.
61, No. 10, May 15, 1987, pp. 4894-4901 [online], [retrieved on
Mar. 23, 2023]. Retrieved from the Internet <URL:https://pubs.aip.
org/aip/jap/article/61/10/4894/172543/The-effects-of-Cr2O3-and-
Fe2O3-additions-on-the>. (Year: 1987).*

(Continued)

*Primary Examiner* — John E Breene
*Assistant Examiner* — Daniel M Quinn
(74) *Attorney, Agent, or Firm* — Rankin, Hill & Clark
LLP

(57)                ABSTRACT

There is provided a measuring tool attachment cover that
combines ease of holding and performance (for example,
heat insulation). An attachment cover includes a front face
layer 110, a rear face layer 120 and an intermediate layer
130. The front face layer 110 and the rear face layer 120 are
compact layers with low porosity, and the intermediate layer
130 is a hollow structural layer with higher porosity than the
front face layer 110 and the rear face layer 120. The hollow
structural layer includes two or more layers with different
porosity, and a layer of the two or more layers closer to the
front face has higher porosity than a layer closer to the rear
face. A direction from the rear face layer 120 to the front face
layer 110 is a thickness direction, and a direction orthogonal (Continued)

UPPER SIDE

REAR FACE

FRONT ◄─────────────► REAR

FRONT FACE

LOWER SIDE to the thickness direction is a width direction. The hollow structural layer has elastic modulus distribution in the width direction, and an elastic modulus of a certain area is different from an elastic modulus of an area surrounding the certain area.

8 Claims, 14 Drawing Sheets

(58) Field of Classification Search
USPC .................. 33/784, 501, 700, 783, 813, 831
See application file for complete search history.

(56) References Cited

U.S. PATENT DOCUMENTS

| | | | | | |
|---|---|---|---|---|---|
| 5,353,474 | A | * | 10/1994 | Good | B25G 1/102 |
| | | | | | 173/171 |
| 6,309,721 | B1 | * | 10/2001 | Gladfelter | B60R 13/08 |
| | | | | | 428/36.1 |
| 6,519,867 | B1 | * | 2/2003 | Saeki | G01B 3/18 |
| | | | | | 33/813 |
| 10,031,350 | B2 | * | 7/2018 | Fonte | G16H 50/50 |
| 2011/0061256 | A1 | * | 3/2011 | Hayashida | G01B 5/0014 |
| | | | | | 33/831 |

FOREIGN PATENT DOCUMENTS

| | | | |
|---|---|---|---|
| JP | 2001311233 | A * | 11/2001 |
| JP | 3546184 | | 7/2004 |
| JP | 2011-080977 | A | 4/2011 |
| JP | 5601910 | | 10/2014 |
| JP | 2019-104243 | A | 6/2019 |

OTHER PUBLICATIONS

Molybdenum (Mo)—Properties, Applications. Data table [online]. AZoM, 2001 [retrieved on Mar. 23, 2025]. Retrieved from Internet <URL: https://www.azom.com/properties.aspx?ArticleID=616>. (Year: 2001).*

Thermal Conductivity of Metals and Alloys: Data Table & Reference Guide. Data table [online]. The Engineering ToolBox, 2005 [retrieved on Mar. 23, 2025]. Retrieved from the Internet <URL: www.engineeringtoolbox.com/thermal-conductivity-metals-d_858. html>. (Year: 2005).*

Buyakova, S. et al. Porosity and mechanical properties of zirconium ceramics. New Operational Technologies AIP Conference Proceedings, vol. 1688, No. 1, Nov. 17, 2015, pp. 1-5 [online], [retrieved Mar. 22, 2025]. Retrieved from the Internet <URL:https://pubs.aip. org/aip/acp/article/1688/1/030009/805308/Porosity-and-mechanical-properties-of-zirconium>. (Year: 2015).*

Yldz, B. et al. Evaluation of mechanical properties of Al2O3—Cr2O3 ceramic system prepared in different Cr2O3 ratios for ceramic armour components. Ceramics International, vol. 45, No. 16, Jul. 3, 2019, pp. 20575-20582 [online], [retrieved Mar. 23, 2025]. Retrieved from the Internet <URL:https://www.sciencedirect. com/science/article/pii/S0272884219318565?via%3Dihub>. (Year: 2019).*

Screen captures from YouTube video clip entitled "3D Printing a Replacement Handle with SketchUp—Part 2," 3 pages, uploaded on Apr. 24, 2015 by user "MasterSketchUp". Retrieved from Internet: <https://www.youtube.com/watch?v=dhG33QL0UFk>. (Year: 2015).*

Screen captures from YouTube video clip entitled "Do Flexible Grips made with a 3D Pen Work?," 1 page, uploaded on Sep. 18, 2019 by user "Potent Principles". Retrieved from Internet: <https:// www.youtube.com/watch?v=jfpKnkCGzzs>. (Year: 2018).*

Japanese Office Action Corresponding to JP Patent Application No. 2021-146526, dated May 20, 2025, 8 pages.

* cited by examiner

100

MEASURING TOOL ATTACHMENT COVER

INCORPORATION BY REFERENCE

This application is based upon and claims the benefit of priority from JP patent application No. 2021-146526, filed on Sep. 8, 2021 (DAS code 62EA), the disclosure of which is incorporated herein in its entirety by reference.

BACKGROUND OF THE INVENTION

Field of the Invention

The present invention relates to a measuring tool attachment cover. In particular, the present invention relates to an attachment cover that contributes to improving the ease of holding or heat insulation of what is called hand-held measuring tools, such as micrometers and calipers.

Description of Related Art

As hand-held measuring tools, micrometers and calipers are used, for example.

In the case of such a hand-held measuring tool, there is a problem that when a hand grips the measuring tool directly, the heat from the hand is transferred, and the measurement accuracy is changed.

For this reason, calipers and micrometers are covered with a heat insulating cover as an accessory to prevent heat from a hand from being transferred directly to the measuring tools. (See JP 2593028 B, JP 3546184 B, and JP 5601910 B)

SUMMARY OF THE INVENTION

JP 2593028 B and JP 5601910 B disclose a heat insulating cover having a hard-shell-like structure that forms a hollow space between a measuring tool and a hand. However, when such a hard-shell-like heat insulating cover having a hollow space is attached to a measuring tool, the heat insulating cover makes the gripper of the measuring tool thicker, which makes difficult for users with small hands to grip the measuring tool. In addition, the hard-shell-like heat insulating cover makes the measuring tool difficult to grip due to its a lumpy texture.

JP 3546184 B also discloses a plastic heat insulating cover, but even plastic resin has some thermal conductivity, and the heat from a hand is transferred to the measuring tool when the heat insulating cover is held for a long time.

Making a heat insulating cover thicker to prevent heat transfer makes it difficult to grip, but making a heat insulating cover thinner for easy grip reduces the heat insulation effect. There has been no well-balanced heat insulating covers.

Moreover, although some heat insulating covers are unevenly shaped to fit the shape of a hand (fingers), it has been difficult to provide a cover that is easy to use for individual users and has high performance (heat insulation) since each user has a different hand size and grip style. Therefore, there is a need for a measuring tool attachment cover that is both easy to hold and has good performance (for example, heat insulation).

It is also difficult for measuring tool manufacturers to provide all heat insulating covers for each model and type (size) of measuring tools.

For example, preparing injection molds for all patterns is quite costly.

Therefore, a heat insulating cover has been an accessory provided only for high-precision measuring tools.

A measuring tool attachment cover according to an exemplary embodiment of the present invention is a measuring tool attachment cover capable of attaching to and detaching from a measuring tool to be hand-held by a user to perform a measurement work, in which the measuring tool includes a an outer surface having a gripping part contacting with a hand of the user gripping the measuring tool, the attachment cover is attached to the measuring tool to cover at least the gripping part, and the attachment cover has a hollow structural part formed by porous or a lattice structure.

In an exemplary embodiment of the invention, it is preferable that the attachment cover has a front face contacting with the hand of the user and a rear face contacting with the measuring tool, the front face is constituted by a front face layer, the rear face is constituted by a rear face layer, a layer between the front face layer and the rear face layer is an intermediate layer, the front face layer and the rear face layer are compact layers with low porosity, and the intermediate layer is a hollow structural layer with larger porosity than the front face layer and the rear face layer.

In an exemplary embodiment of the invention, it is preferable that the intermediate layer is open to the outside through an opening provided in the front face layer.

In an exemplary embodiment of the invention, it is preferable that the hollow structural layer includes two or more layers with different elastic moduli, and a layer of the two or more layers closer to the front face has a lower elastic modulus than a layer closer to the rear face.

In an exemplary embodiment of the invention, it is preferable that the hollow structural layer includes two or more layers with different thermal conductivity, and a layer of the two or more layers closer to the front face has lower thermal conductivity than a layer closer to the rear face.

In an exemplary embodiment of the invention, it is preferable that the hollow structural layer includes two or more layers with different porosity, and a layer of the two or more layers closer to the front face has higher porosity than a layer closer to the rear face.

In an exemplary embodiment of the invention, it is preferable that a direction from the rear face layer to the front face layer is a thickness direction, a direction orthogonal to the thickness direction is a width direction, the hollow structural layer has elastic modulus distribution in the width direction, and an elastic modulus of a certain area is different from an elastic modulus of an area surrounding the certain area.

In an exemplary embodiment of the invention, it is preferable that the elastic modulus distribution corresponds to a state of a hand of each user gripping the measuring tool, and an elastic modulus of an area contacting with the hand of the user is different from an elastic modulus of an area surrounding the hand-contact area.

In an exemplary embodiment of the invention, it is preferable that the hollow structural layer includes two or more layers with different elastic moduli, a layer of the two or more layers closer to the front face has a lower elastic modulus than a layer closer to the rear face, a direction from the rear face layer to the front face layer is a thickness direction, a direction orthogonal to the thickness direction is a width direction, the layer of the two or more layers closer to the front face has elastic modulus distribution in the width direction, an elastic modulus of a certain area is different from an elastic modulus of an area surrounding the certain area, the elastic modulus distribution corresponds to a state of a hand of each user gripping the measuring tool, an area contacting with the hand of the user where the elastic modulus is changed is a fulcrum area, and the fulcrum area has a higher elastic modulus than an area surrounding the fulcrum area and a lower elastic modulus than the layer of the two or more layers closer to the rear face.

In an exemplary embodiment of the invention, it is preferable that the hollow structural layer includes two or more layers with different elastic moduli, a layer of the two or more layers closer to the front face has a lower elastic modulus than a layer closer to the rear face, a direction from the rear face layer to the front face layer is a thickness direction, a direction orthogonal to the thickness direction is a width direction, the layer of the two or more layers closer to the front face has elastic modulus distribution in the width direction, an elastic modulus of a certain area is different from an elastic modulus of an area surrounding the certain area, the elastic modulus distribution corresponds to a state of a hand of each user gripping the measuring tool, an area contacting with the hand of the user where the elastic modulus is changed is a fulcrum area, and the fulcrum area has a lower elastic modulus than an area surrounding the fulcrum area.

In an exemplary embodiment of the invention, it is preferable to provide a data structure containing 3D-CAD data for manufacturing the measuring tool attachment cover.

The data structure contains shape data about the attachment cover corresponding to each model of a measuring tool, elastic modulus surface distribution data reflecting force distribution data when a hand of a user grips the measuring tool to the shape data about the attachment cover, and data about an elastic modulus preference of a hand-contact area for each user.

Furthermore, the data structure may be a data structure (or a program) containing an adjustment function unit (adjustment function data or program) that causes a computer to perform a user interface (UI) function that provides an input screen on which the user can input adjustment values for the material, hardness (porosity), and the like of the attachment cover, a change adjustment function that performs change adjustment of the material and hardness (porosity) according to the input adjustment values, and a combining function that combines the shape data about the attachment cover, the elastic modulus surface distribution data, and the data about the elastic modulus preference after adjustment.

In an exemplary embodiment of the invention, it is preferable to manufacture the measuring tool attachment cover by a 3D printer.

A custom-made support system for a measuring tool attachment cover according to an exemplary embodiment of the present invention includes:

a manufacturer-end server that stores shape data about an attachment cover corresponding to each model of a measuring tool; and a user terminal that accesses the manufacturer-end server via the internet, in which the manufacturer-end server transmits, in response to a request from the user terminal, the shape data about the attachment cover requested by the user terminal to the user terminal.

A custom-made support system for a measuring tool attachment cover according to an exemplary embodiment of the present invention includes:

a manufacturer-end server that stores shape data about an attachment cover corresponding to each model of a measuring tool; and a user terminal that accesses the manufacturer-end server via the internet, in which in response to a request from the user terminal, the manufacturer-end server generates, for each user, shape data about the attachment cover combined with elastic modulus surface distribution data reflecting force distribution data when a hand of the user grips the measuring tool to the shape data about the attachment cover requested by the user terminal, and transmits the generated shape data about the attachment cover to the user terminal.

In an exemplary embodiment of the invention, it is preferable that the force distribution data when the hand of the user grips the measuring tool is stored in the manufacturer-end server as user-customized data.

In an exemplary embodiment of the invention, it is preferable that the user customization data includes data about elastic modulus preference of a hand-contact area for each user.

DETAILED DESCRIPTION

Figure 1:
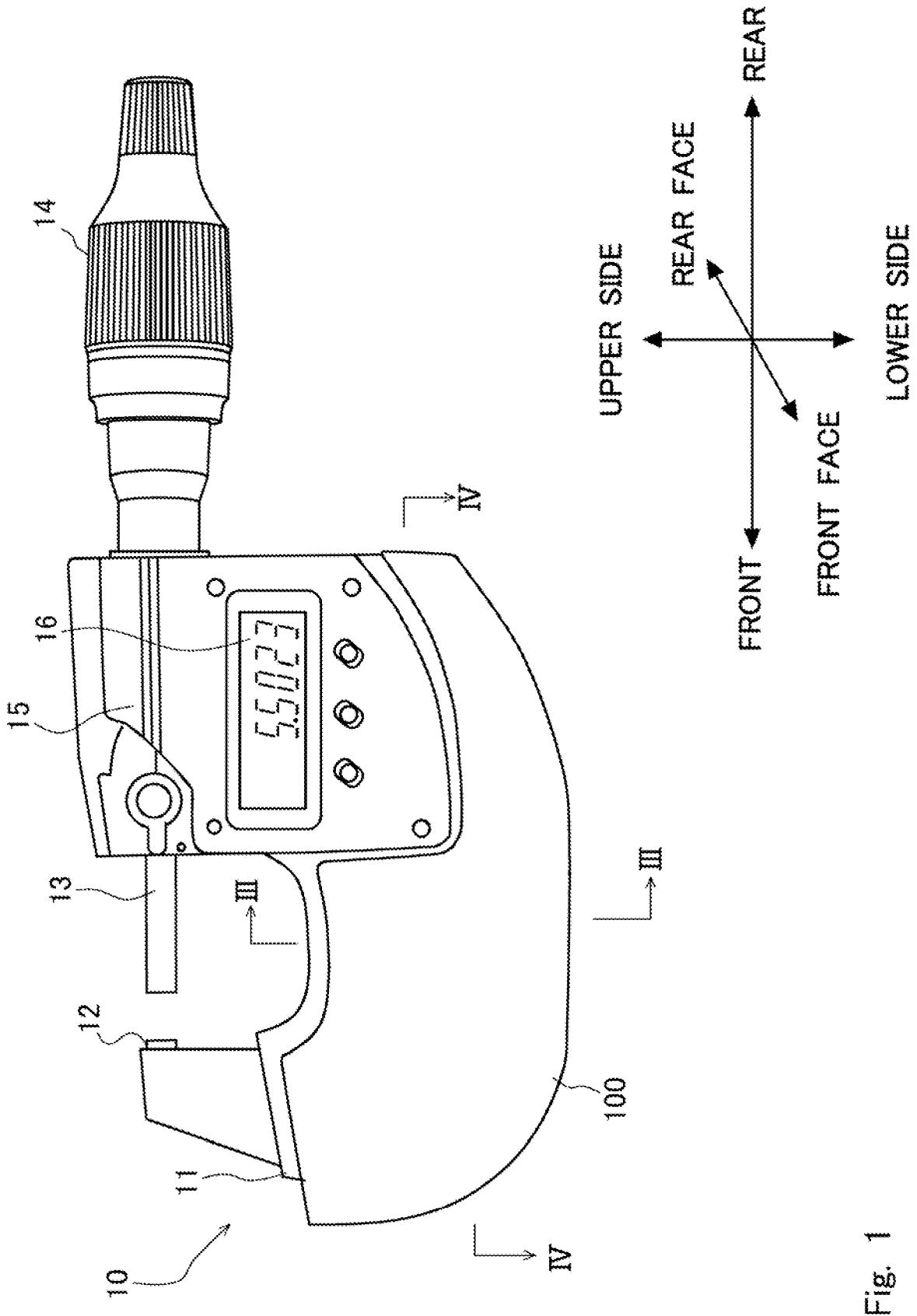
FIG. 1 is a diagram showing a micrometer with a heat insulating cover attached.

Embodiments of the present invention will be illustrated and described with reference to reference signs assigned to elements in the drawings.

First Exemplary Embodiment

As an embodiment of an measuring tool attachment cover, a heat insulating cover 100 of a micrometer 10 is exemplified and is hereinafter simply referred to as the heat insulating cover 100.

FIG. 1 shows the micrometer 10 with the heat insulating cover 100 attached.

First, the micrometer 10 itself is known, but is briefly described.

The micrometer 10 includes a U-shaped frame 11, an anvil 12, a spindle 13, and an electronic unit 15.

The anvil 12 is disposed on an inner side of one end of the U-shaped frame 11. The spindle 13 is provided on the other end of the U-shaped frame 11 and is movable forward and backward with respect to the anvil 12. On the other end of the U-shaped frame 11, a thimble 14 is disposed on the opposite side of the spindle 13. When the thimble 14 is rotated with fingers, the spindle 13 is also rotated.

The spindle 13 is moved forward and backward by a feeding screw.

In addition, an encoder (not shown) is provided at the other end of the U-shaped frame 11 as a detection means to detect the rotation amount of the spindle 13. (The U-shaped frame 11, the anvil 12, the spindle 13, and the encoder constitute a measurement means).

The electronic unit 15 is provided on the other end of the U-shaped frame 11.

The electronic unit 15 includes a built-in signal processor (not shown) and a display unit 16.

The display unit 16 digitally displays information such as measurement data. The display unit 16 is provided on the front face of the micrometer 10 on the other end of the U-shaped frame 11.

Figure 2:
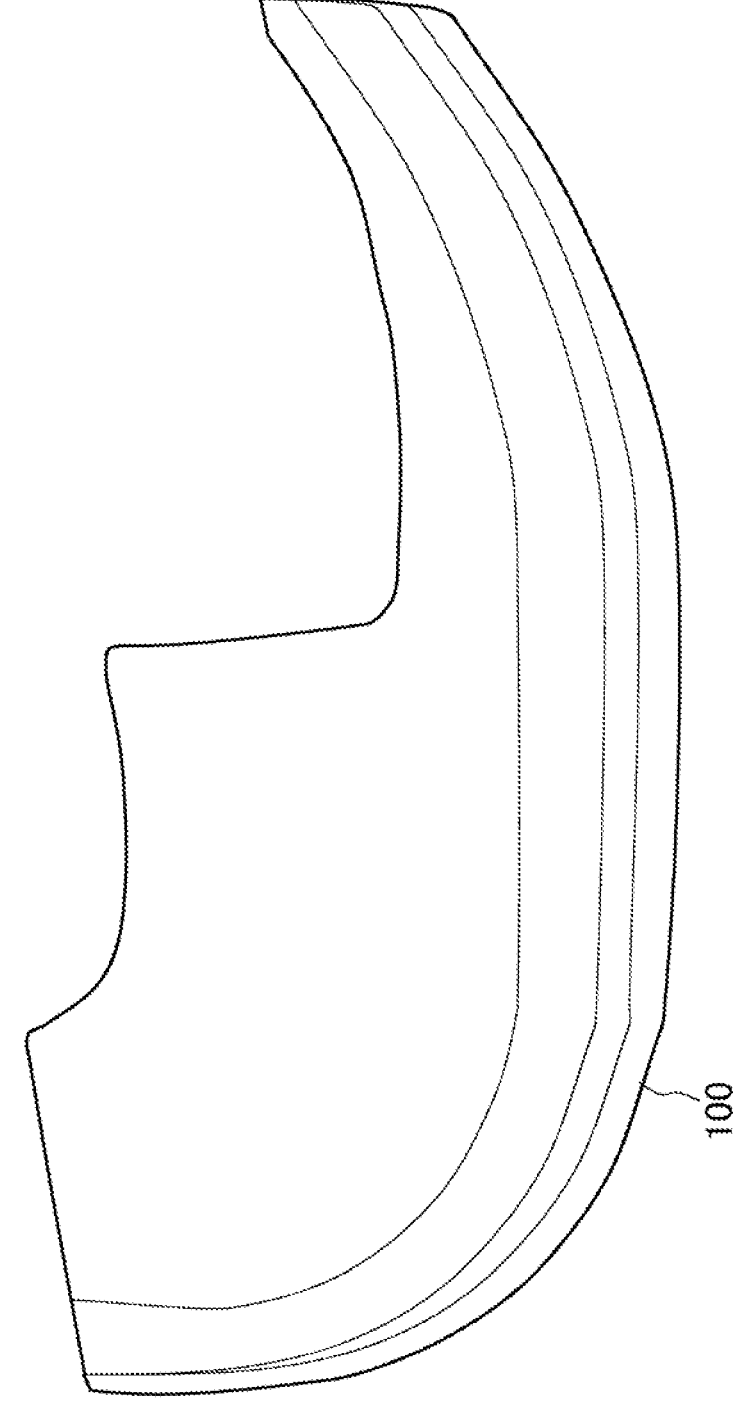
FIG. 2 is a plan view of the heat insulating cover.

FIG. 2 is a plan view of the heat insulating cover.

The heat insulating cover 100 is L-shaped in plan view and is externally fitted to the U-shaped frame 11 to cover the lower part of the U-shaped frame 11 except for the display unit 16.

Figure 3:
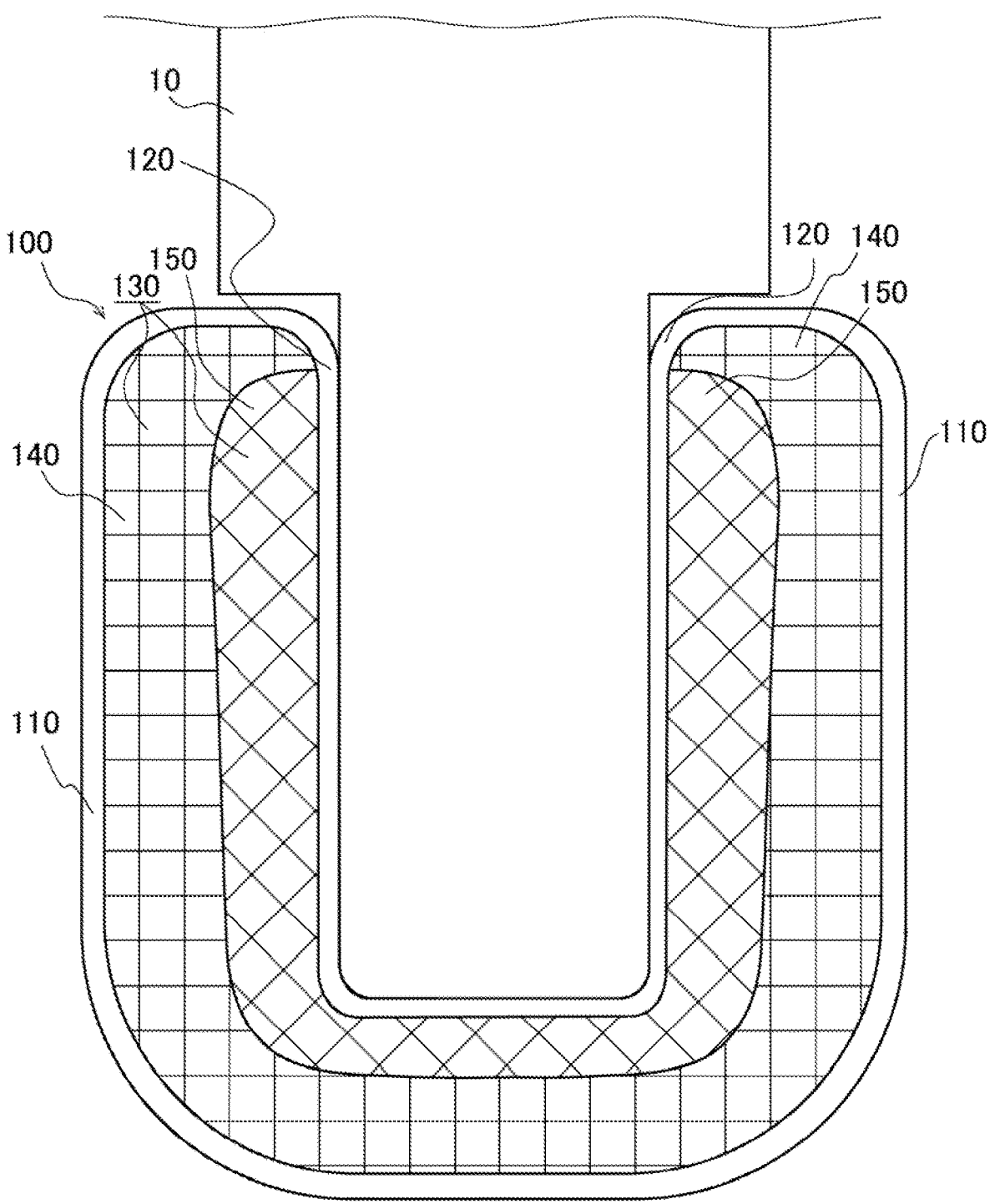
FIG. 3 is a cross-sectional view of the heat insulating cover taken along the line III-III in FIG. 1.

FIG. 3 is a cross-sectional view of the heat insulating cover 100 taken along the line III-III in FIG. 1.

As shown in the cross-sectional view in FIG. 3, the heat insulating cover 100 has a U-shaped cross-sectional shape that closely covers the lower side face, the front face, and the rear face of the U-shaped frame 11.

As shown in the cross-sectional view in FIG. 3, the heat insulating cover 100 has multiple layers.

The face of the heat insulating cover 100 contacting with a hand of a user (front face) is a front face layer 110.

The face of the heat insulating cover 100 contacting with the U-shaped frame 11 (rear face) is a rear face layer 120.

The layer between the front face layer 110 and the rear face layer 120 is an intermediate layer 130.

The porosity of the front face layer 110 and the rear face layer 120 is lower than that of the intermediate layer 130. Alternatively, the front face layer 110 and the rear face layer 120 have no voids, as in porous or a lattice structure.

Therefore, the front face layer 110 and the rear face layer 120 are referred to as compact layers.

The front face layer 110 is made of a compact layer because a smooth texture is preferable to a rough texture as the part contacting with the hand, and to prevent water and oil from entering the inside of the heat insulating cover 100. The rear face layer is made of a compact layer because closely contacting with the measuring tool as the part directly contacting with the measuring tool makes it difficult for the heat insulating cover 100 to easily come off. For example, if there are many voids in the rear face layer 120, the friction between the measuring tool and the heat insulating cover 100 is small. Then, the heat insulating cover 100 is not firmly attached to the measuring tool, and some separate engaging means is required between the measuring tool and the heat insulating cover 100. In addition, since the intermediate layer 130, which will be described later, needs to have a hollow structure with many voids, the front face layer 110 and the rear face layer 120 that are firmly shaped (have high elastic modulus and rigidity) are provided to sandwich the hollow structure to form the heat insulating cover 100 with high porosity and a stable shape as a whole.

The intermediate layer 130 is a hollow structural layer with larger porosity than the front face layer 110 and the rear face layer 120.

The intermediate layer 130 is constituted by two layers with different porosity.

The layer of the intermediate layer 130 closer to the front face is a first intermediate layer 140.

The layer of the intermediate layer 130 closer to the rear face is a second intermediate layer 150.

The elastic modulus of the first intermediate layer 140 is smaller than that of the second intermediate layer 150. Making the elastic modulus of the first intermediate layer 140 smaller than that of the second intermediate layer 150 is for the user gripping the micrometer 10 to deform (for example, recess) the front face layer 110 together with the first intermediate layer 140 to fit the shape of the hand and feel a moderate degree of flexibility. Making the elastic modulus of the second intermediate layer 150 larger than that of the first intermediate layer 140 is to prevent stress when the user grips or releases the micrometer 10 from being transmitted directly to the micrometer 10, and to firmly attach the rear face layer 120 to the micrometer 10 with the relatively high elasticity (rigidity) of the second intermediate layer 150 in order for the heat insulating cover 100 not to come off from the micrometer 10.

In other words, if the difference in elastic modulus is achieved by a difference in porosity, the porosity of the first intermediate layer 140 is higher than the porosity of the second intermediate layer 150.

Making the porosity of the first intermediate layer 140 higher is to increase the heat insulation on the side closer to the hand.

Figure 4:
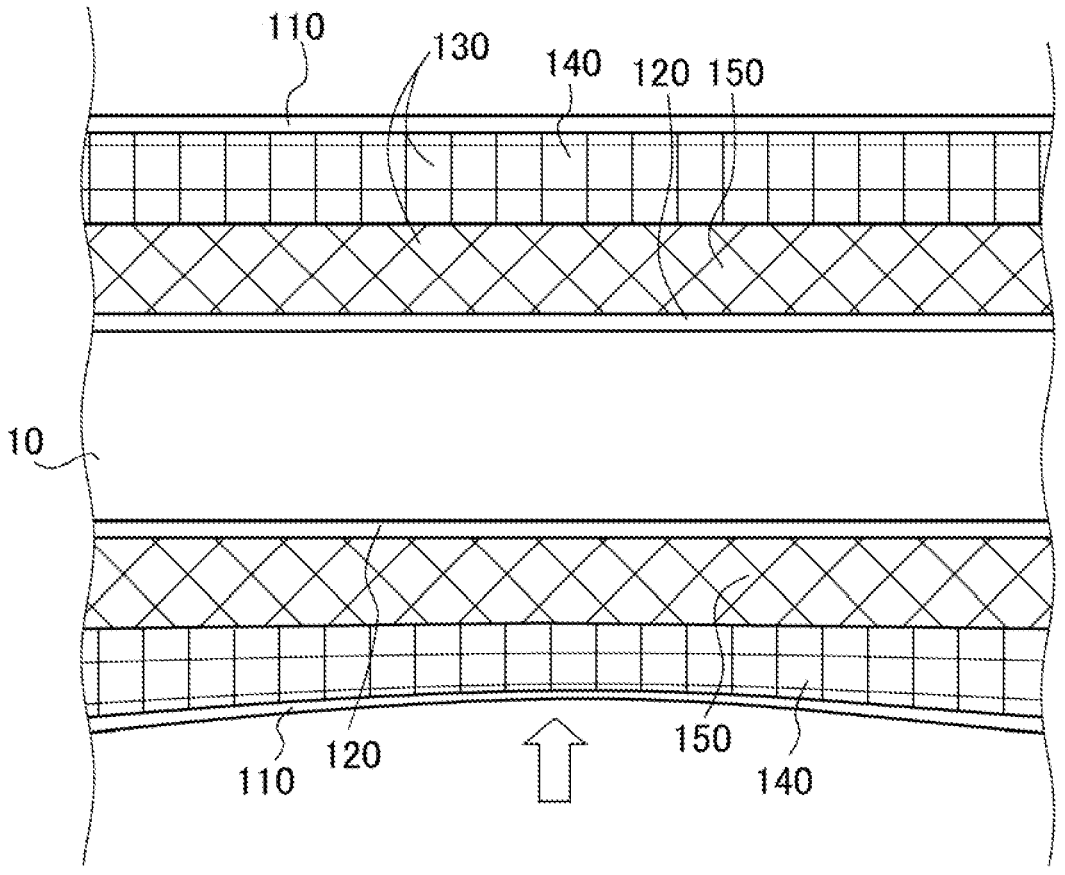
FIG. 4 is a diagram showing the deformation of the heat insulating cover when the front face of the heat insulating cover is pressed.

From the viewpoint of heat insulation effect, it is desirable that the first intermediate layer 140 and the second intermediate layer 150 have equivalent high porosity. However, if the first intermediate layer 140 and the second intermediate layer 150 are too soft, the heat insulating cover 100 cannot hold the measuring tool, and if the heat insulating cover 100 is too deformed, the user cannot tightly hold (grip) the heat insulating cover 100 with the hand. Therefore, the porosity of the second intermediate layer 150 is made relatively low, and the porosity of the first intermediate layer 140 is made high enough for the user to feel a moderate degree of flexibility in order to obtain both a proper fit and heat insulation effect when the user grips the heat insulating cover 100 with the hand. FIG. 4 is a diagram showing the deformation of the heat insulating cover 100 when the front face of the heat insulating cover 100 is pressed.

Figure 5:
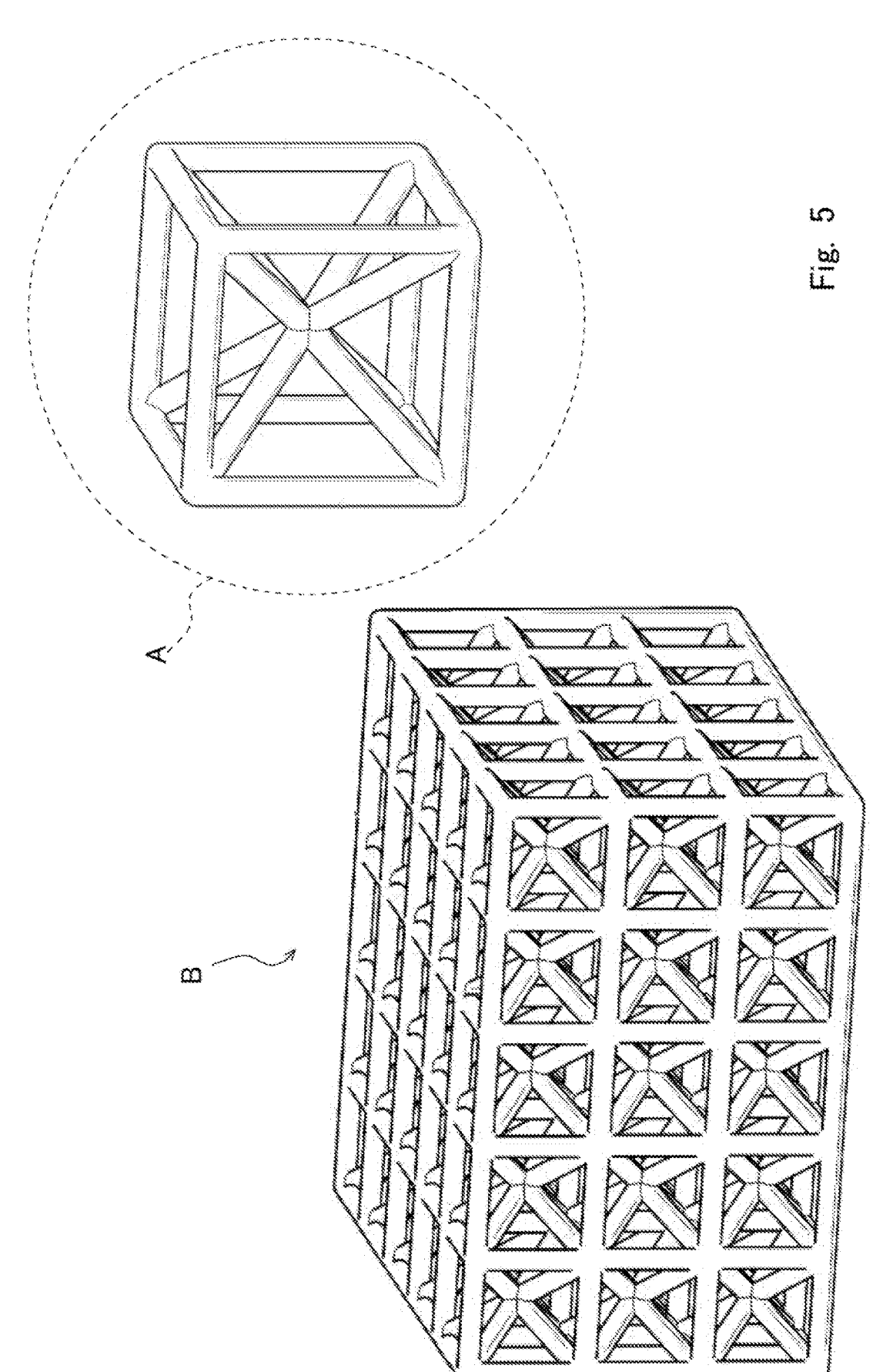
FIG. 5 is a diagram showing an example of a lattice structure.

To form the hollow structure of the intermediate layer 130, porous resin (foaming resin) may be used, or a lattice structure may be formed (manufactured) by a 3D printer. For example, the lattice structure may be formed by making a unit lattice shown in Enclosure A in FIG. 5 three-dimensionally continuous as shown in Reference sign B in FIG. 5. As the material of the lattice structure, resin is used as an example, but metal material may also be used since metal 3D printers are known.

To change the porosity, for example, to make the porosity high, the cycle of the lattice may be increased (in other words, the length of the beams may be increased), or the thickness of the beams may be made thinner.

For the same material, a change in porosity is, in other words, a change in elastic modulus (rigidity modulus).

Since the heat insulating cover 100 needs to be considered not only from the viewpoint of ease of gripping but also from the viewpoint of heat insulation and manufacturing cost, it is reasonable to change the elastic modulus (rigidity modulus) according to the porosity. However, the porosity may be the same and the material may be changed, for example. In this case, the elastic modulus of the first intermediate layer 140 is only required to be lower than that of the second intermediate layer 150. In addition, the thermal conductivity of the first intermediate layer 140 is desirably designed to be lower than that of the second intermediate layer 150. For example, it is preferable as the target thermal conductivity that the total thermal conductivity from the front face layer 110 to the rear face layer 120 is 0.1 [W/m·K] to 0.5 [W/m·K].

The thickness of the heat insulating cover 100 (from the front face layer to the rear face layer) is desirably, for example, about 1 mm to 5 mm when no stress is applied. If the deformation (tactile sense) when the heat insulating cover 100 is held in the hand is desired to be clear, or if heat insulation is to be improved, the thickness is desirably, for example, 10 mm to 15 mm when no stress is applied, and 1 mm to 5 mm when the stress of the hand is applied. In the drawing, the thicknesses of the first intermediate layer 140 and the second intermediate layer 150 of the intermediate layer 130 are substantially the same, but either one may be made thicker. For example, since the first intermediate layer 140 is considered to have a stronger influence on the adjustment of the feel when the heat insulating cover 100 is gripped (ease of gripping) and heat insulation performance, 50% to 70% of the intermediate layer 130 may be allocated to the first intermediate layer 140.

Figure 6:
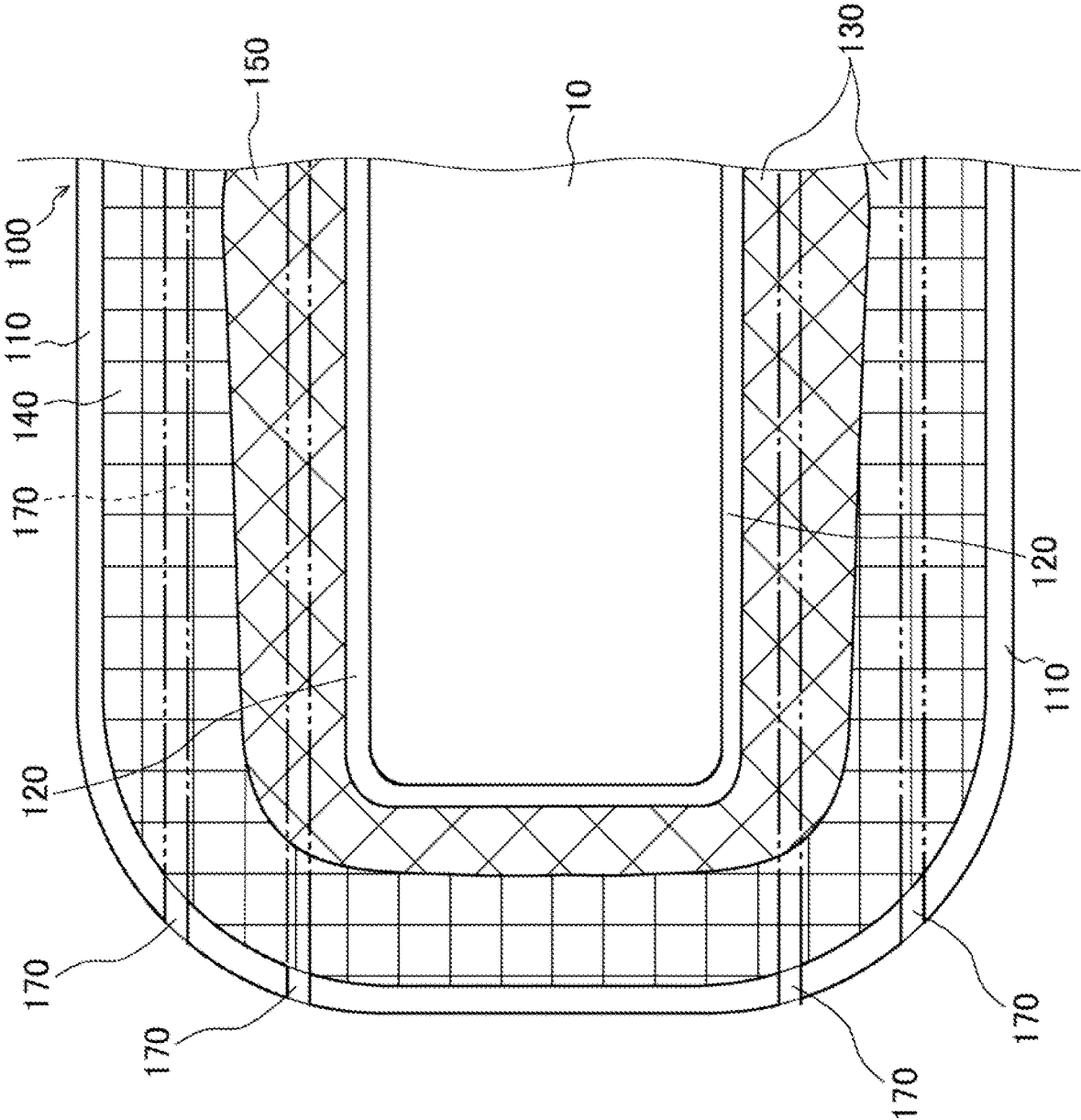
FIG. 6 is a cross-sectional view of the heat insulating cover taken along the line VI-VI in FIG. 1.

FIG. 6 is a cross-sectional view of the heat insulating cover 100 taken along the line VI-VI in FIG. 1.

As shown in FIG. 6, the heat insulating cover 100 is desirably provided with a ventilation hole 170. The opening of the ventilation hole 170 is desirably provided on the front end face of the heat insulating cover 100. If the opening of the ventilation hole 170 is provided at the front face or rear face of the heat insulating cover 100, heat from the hand or moist air can flow into the ventilation hole 170, which is undesirable. Considering the way the micrometer 10 is gripped, the hand does not touch the front end face of the heat insulating cover 100 but is away therefrom. If more openings for the ventilation hole 170 are needed, it is desirable to provide them on the rear end face of the heat insulating cover 100.

When the hollow structure of the intermediate layer 130 is formed by a lattice structure, the interior of the intermediate layer 130 (the first intermediate layer 140 and the second intermediate layer 150) is open to the outside air as long as an opening is provided in the front face layer 110. In this case, the ventilation hole 170 can be a hole (opening) formed in the front face layer 110. When the hollow structure of the intermediate layer 130 is formed of porous resin (foaming resin), a ventilation passage is formed through the interior of the intermediate layer 130 (the first intermediate layer 140 and the second intermediate layer 150) and used as the ventilation hole 170. In FIG. 6, an example of the ventilation passage is shown as a double-dashed line. In the example in FIG. 6, the ventilation passage is provided in a direction that intersects (for example, orthogonal to) the thickness direction.

In the above, the intermediate layer 130 is described as having layers with different elastic moduli (porosity) in the thickness direction. In addition, the intermediate layer 130 may have a difference (distribution) in elastic modulus in the width direction.

The difference in elastic modulus can be caused by a difference in porosity, or the difference in elastic modulus (or rigidity modulus) can be caused by making the material of that area different from the surrounding area. In this specification, the difference in elastic modulus is caused by a difference in porosity of the same material. However, the present invention is not limited thereto.

Figure 7:
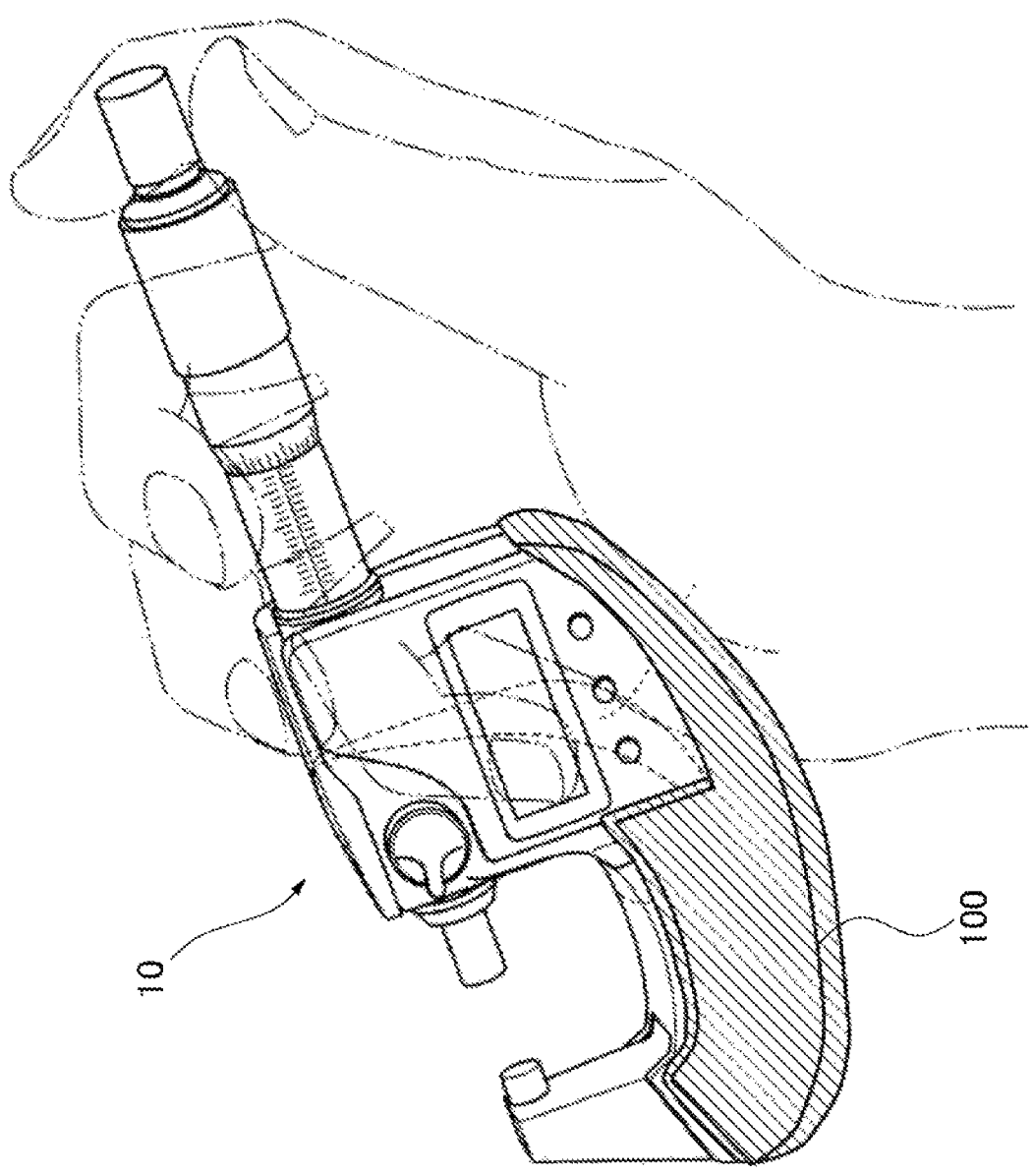
FIG. 7 is a view showing an example of how to hold a micrometer.

It is desirable that the heat insulating cover 100 to have high porosity as a whole to improve the heat insulation, but it is difficult to balance the porosity because if the cover becomes too soft as a whole, the heat insulating cover 100 is difficult to handle. Therefore, the elastic modulus of a fulcrum area to which the force is applied when the micrometer 10 is gripped by hand is made different from the elastic modulus of the surrounding area. FIG. 7 is a diagram showing an example of how to hold the micrometer 10. In this example, the upper side face of the U-shaped frame 11 is pressed with the ring finger, and a part of a lower side face of the rear face of the U-shaped frame 11 is placed against the palm of the hand. The micrometer 10 is held in this state, and the thimble 14 is rotated with the index finger and the thumb.

While being a highly accurate measuring tool in terms of its measuring principle, the micrometer 10 is relatively difficult to hold in one hand as shown in FIG. 7. For example, it takes a skill for a woman with a small hand or a weak grip to hold the micrometer 10 firmly in one hand while accurately measuring one workpiece after another.

Figure 8:
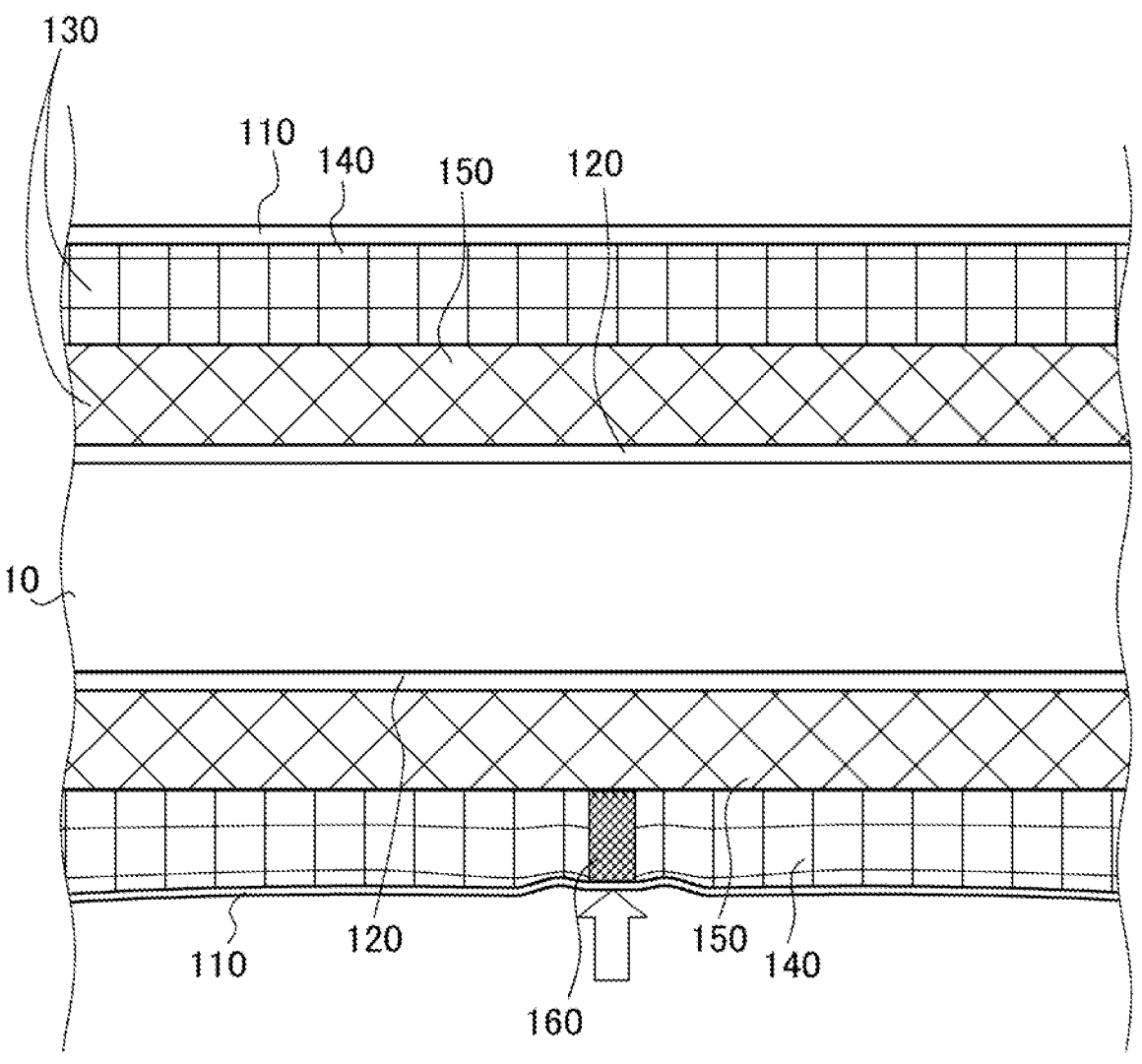
FIG. 8 is a diagram showing an example of a hand contact area of the heat insulating cover that is referred to as a fulcrum area.

For example, as exemplified in FIG. 8, the elastic modulus of the area of the heat insulating cover 100 contacting with the hand is changed. In this example, the porosity is lowered to increase the elastic modulus of the hand-contact area. In addition, the elastic modulus (porosity) is changed only in the first intermediate layer 140, and the second intermediate layer 150 is a layer of uniform elastic modulus (porosity). The area contacting with the hand where the elastic modulus is changed is referred to as a fulcrum area 160. By making the elastic modulus (rigidity) of the fulcrum area 160 different from the surrounding area, the hand can firmly touch the fulcrum area 160 and firmly grip the micrometer 10. Even though the elastic modulus of the hand-contact area is increased, the area sinks slightly by the force of the hand, which provides a proper fit. The heat insulating cover 100 is also expected to make the micrometer 10 easier to grip than the bare micrometer 10.

In this example, the elastic modulus (rigidity modulus) of the fulcrum area 160 is higher than that of the first intermediate layer 140 other than the fulcrum area 160 (that is, the fulcrum area 160 has lower porosity than the first intermediate layer 140 other than the fulcrum area 160) and is lower than that of the second intermediate layer 150 (that is, the fulcrum area 160 has higher porosity than the second intermediate layer 150). This is because that the first intermediate layer 140 including the fulcrum area 160 is deformed by the force of the hand, but the effect of the stress on the second intermediate layer 150 is to be avoided. Conversely, the elastic modulus (rigidity modulus) of the fulcrum area 160 may be lower than that of the first intermediate layer 140 other than the fulcrum area 160 (that is, the fulcrum area 160 may have higher porosity than the first intermediate layer 140 other than the fulcrum area 160).

Since the hand size is different depending on a user, even if they hold a micrometer (with a heat insulating cover attached) in the same way, the area where the hand touches the micrometer is different. As one idea, if heat insulating covers are to be sold commercially as standard products (ready-made products), the heat insulating covers may be designed to have a certain area with a higher (lower) elastic modulus, assuming the average size of user's hands and the standard way of gripping.

Alternatively, the heat insulating cover 100 can be custom-made to suit the hand size or grip of each user. For example, a pressure sensor (a pressure-sensitive sensor or a strain gauge) is provided on the surface and inside of the heat insulating cover 100 manufactured as a sample to have the user actually hold the micrometer 10 with the sample heat insulating cover attached. This determines which area of the heat insulating cover 100 is used as the fulcrum area 160 by each user. In addition, the user can request that the hand-contact area is made harder (higher elastic modulus (rigidity modulus)) than the surrounding area and how much harder (higher elastic modulus (rigidity modulus)) the hand-contact area is, or the hand-contact area is made softer (lower elastic modulus (rigidity modulus)) than the surrounding area and how much softer (lower elastic modulus (rigidity modulus)) the hand-contact area is depending on the user's preference.

The preferred fulcrum area 160 and hardness for each user may be managed by a manufacturer on a server with their consent. If possible, it is desirable for the manufacturer to collect and store user-customized data for different sizes and types (models and model numbers) of the micrometer for future use.

The manufacturer may manufacture and sell the custom-made heat insulating covers 100 according to a request (the hand shape, the grip style, the hardness/softness preference, and the like) from each user, or may provide (sell) 3D-CAD data for manufacturing the heat insulating covers instead of the heat insulating covers themselves.

Figure 9:
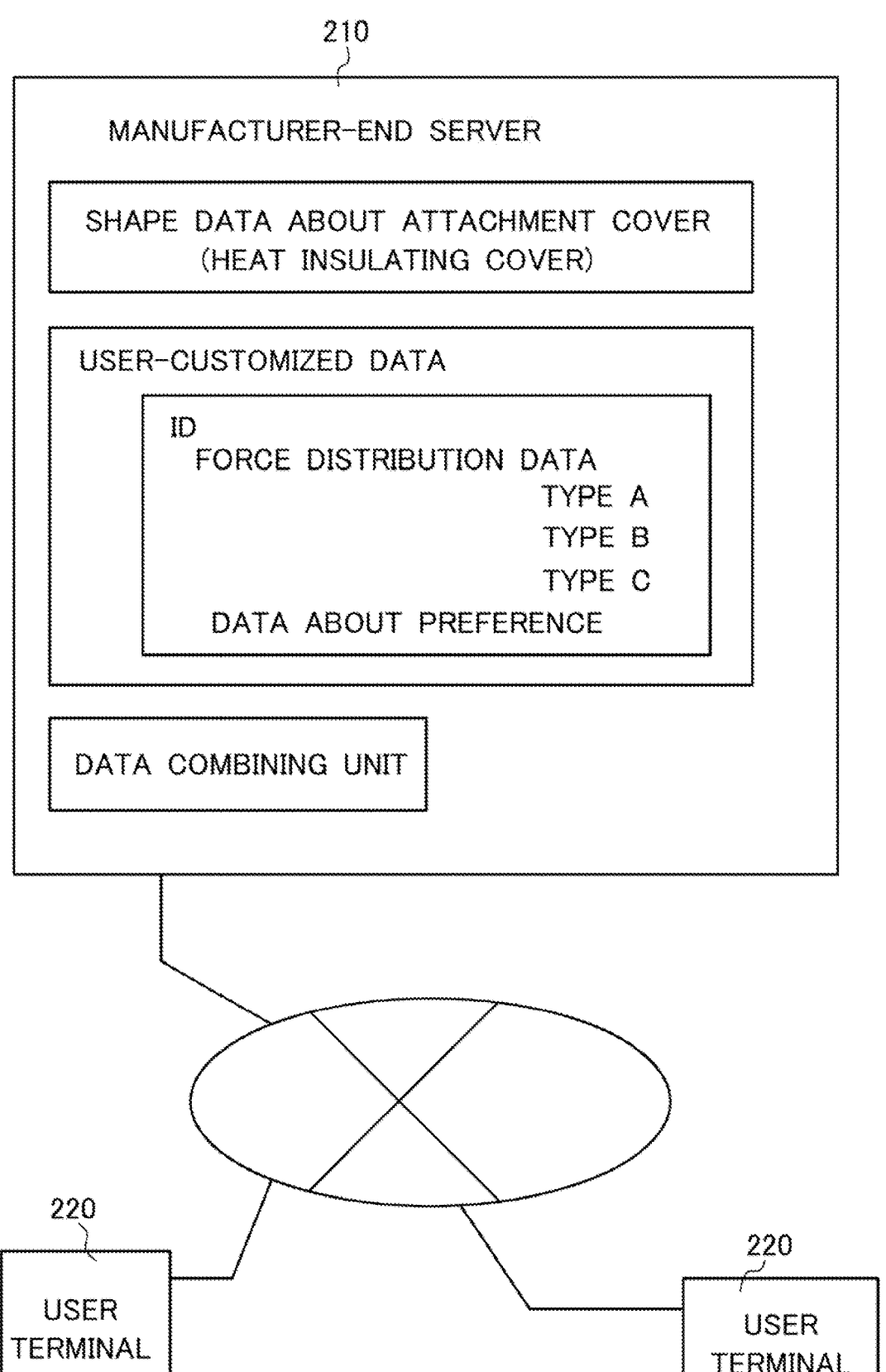
FIG. 9 is a diagram showing an example of a configuration of a custom-made support system for an attachment cover.

FIG. 9 shows an example of a configuration of a custom-made support system for attachment covers.

As exemplified in FIG. 9, shape data about an attachment cover (heat insulating cover) corresponding to each model of a measuring tool (micrometer) is stored in a manufacturer-end server 210 managed by a measuring tool manufacturer. The manufacturer-end server 210 further stores force distribution data acquired for different sizes and types (models and model numbers) of the micrometer 10 (measuring tool) as user-customized data in association with each user (user identification (ID) formation). (The user customized data may be stored in a user terminal 220 instead of in the manufacturer-end server 210, or may be stored in some other data management company or blockchain. Alternatively, the user customized data may not be data stored in advance but user's measurement data obtained in real-time.) The user-customized data may include, in addition to the force distribution data, data about the preference for each user, such as information on whether the hand-contact area is harder (higher elastic modulus (rigidity modulus)) than the surrounding area and how much harder (higher elastic modulus (rigidity modulus)), or softer (lower elastic modulus (rigidity modulus)) than the surrounding area and how much softer (lower elastic modulus (rigidity modulus)).

The user accesses the manufacturer-end server 210 from the user terminal 220 via the internet (a network communication line) and selects the shape (model number) of the heat insulating cover 100 that the user desires to acquire by operating the user interface (UI) provided on the screen. The manufacturer-end server 210 calls the force distribution data corresponding to the user and creates 3D-CAD data about the heat insulating cover 100 custom-made for the user, using the user-customized data, which is data combining the shape data about the heat insulating cover 100 with the data about the preference.

To combine the grip pattern of the user with the shape data about the heat insulating cover, the positions of the fingers and the palm on the heat insulating cover need to be determined. In the case of the micrometer, since the thimble is usually rotated with the index finger and the thumb, the positions of the index finger and the thumb are fixed according to the thimble. Then, the relative positions from them can be used to determine the positions of the other fingers and the palm that touch the heat insulating cover.

In response to the request from the user terminal 220, the 3D-CAD data about the heat insulating cover 100 custom-made for the user is transmitted to the user terminal 220 (while a payment system is used as appropriate).

Note that, a data structure including the 3D-CAD data may be provided via a communication line or may be provided as stored in a recording medium (for example, a non-volatile recording medium).

If the 3D-CAD data is available, the user can manufacture the heat insulating cover 100 by themselves using a 3D printer. Although the user can take some trial and error, the user can acquire the heat insulating cover 100 that suits the user by adding colors and decoration to the surface as well as adjusting the material, hardness, and the like. The manufacturer may also provide 3D-CAD data editing software or UI (editing program) in order for the user to adjust the material, hardness (porosity), and the like of the heat insulating cover 100 by themselves. Accordingly, it is possible to provide the heat insulating cover 100 of a measuring tool (micrometer) that is easy to hold and has excellent heat insulation according to individual preferences.

First Modification

In the above first embodiment, the heat insulating cover of the micrometer 10 has been described as an example, but is applicable to other measuring tools as an measuring tool attachment cover.

Figure 10:
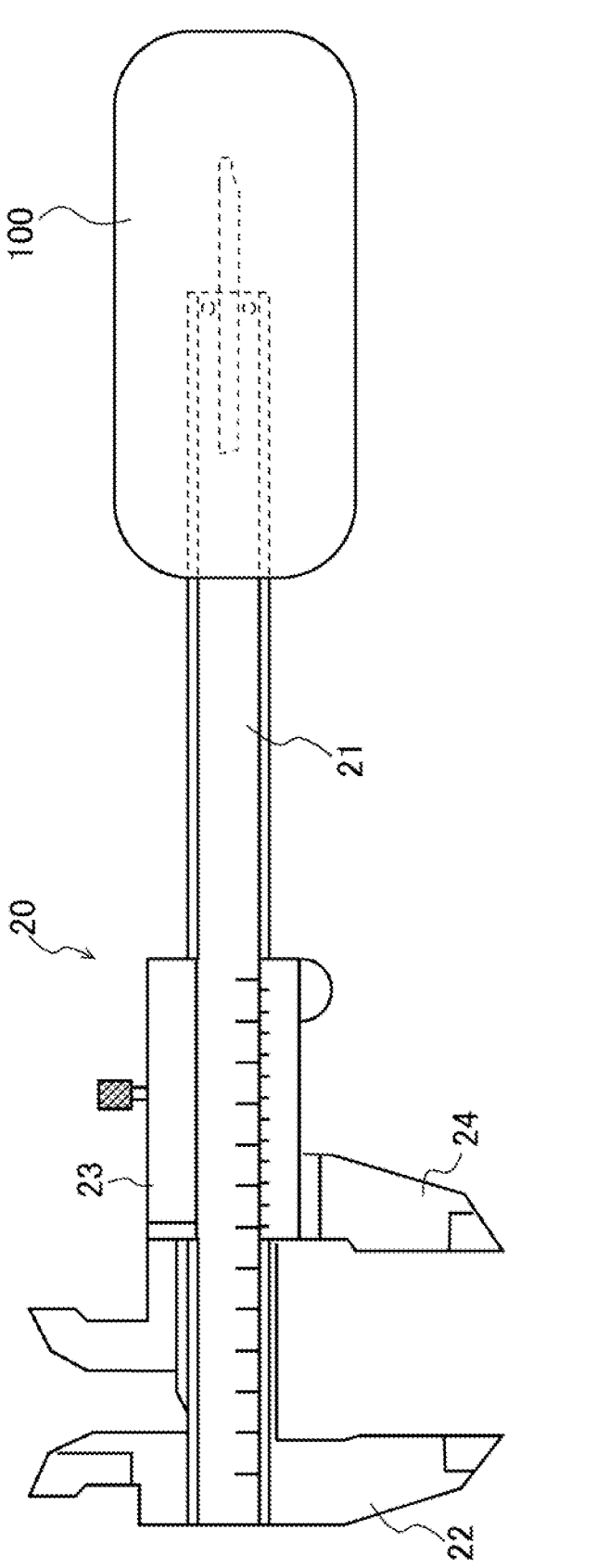
FIG. 10 is a diagram showing an example of the appearance of a heat insulating cover of a caliper.
Figure 11:
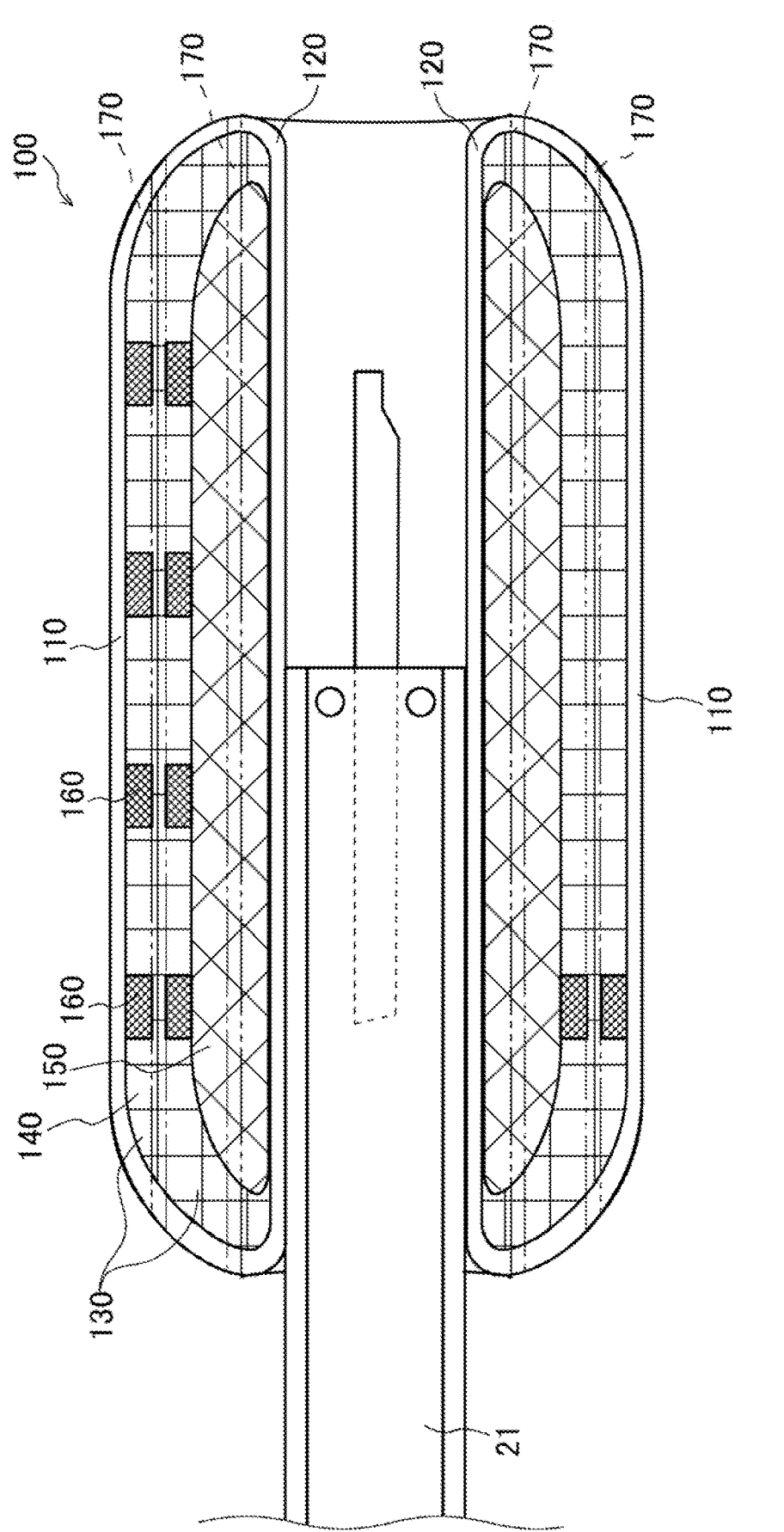
FIG. 11 is an example of a cross-sectional view of the heat insulating cover of the caliper.

A caliper 20 includes a main scale 21, a slider 23, and a fixed-side jaw 22 at one end of the main scale 21. The slider 23 slides along the main scale 21, and a movable-side jaw 24 is provided at one end of the slider 23. The movable-side jaw 24 is paired with the fixed-side jaw 22 of the main scale 21. (The main scale 21, the fixed-side jaw 22 of the main scale 21, the slider 23, the movable-side jaw 24 of the slider 23 constitute a measurement means.) A user is supposed to grip the main scale 21 of the caliper 20, but gripping the main scale 21 directly is not desirable because the heat from the hand is transmitted to the main scale 21. Therefore, the heat insulating cover 100 (attachment cover) is used to cover the main scale 21. For example, FIG. 10 is a diagram showing an example of the appearance of the heat insulating cover 100 of the caliper 20. FIG. 11 is an example of a cross-sectional view of the heat insulating cover 100 of the caliper 20. The heat insulating cover 100 has a layered structure, and each layer is denoted by the same reference sign as in the first embodiment in the cross-sectional view.

Second Modification

Figure 12:
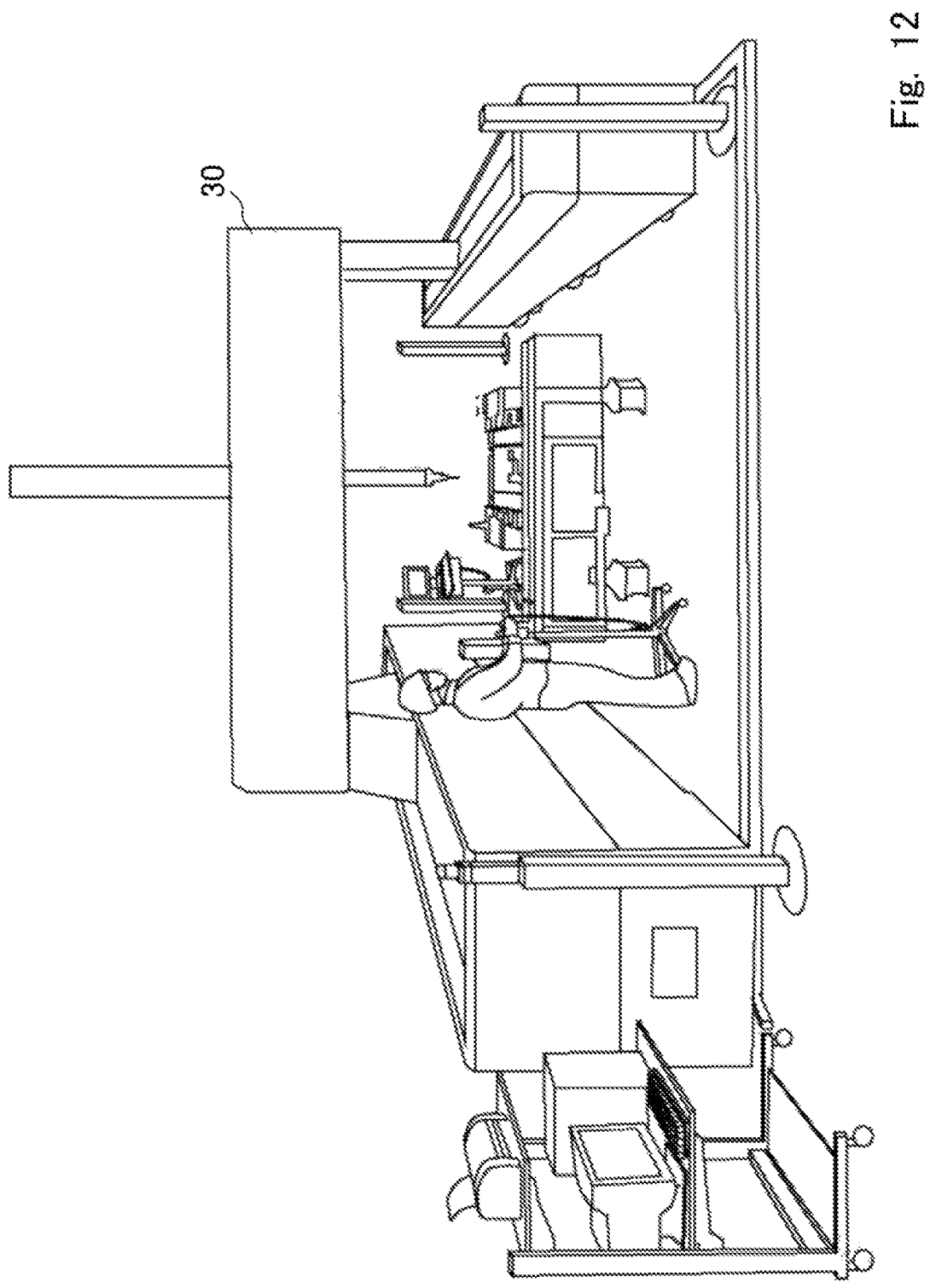
FIG. 12 is a diagram showing an example of the appearance of a large measuring machine (for example, a coordinate measuring machine)

FIG. 12 is a diagram showing an example of the appearance of a large measuring machine 30 (for example, a coordinate measuring machine).

The large measuring machine 30 (for example, a coordinate measuring machine) as shown in FIG. 12 includes a controller 40 that a user can carry in the hand, and the user carries the controller 40 and moves to a position where a workpiece and a measurement probe are easily observed to operate the large measuring machine 30 (for example, a coordinate measuring machine). The portable controller 40 of the large measuring machine 30 (for example, a coordinate measuring machine) can be regarded as a measuring tool that the user holds in the hand and performs a measurement work.

Figure 13:
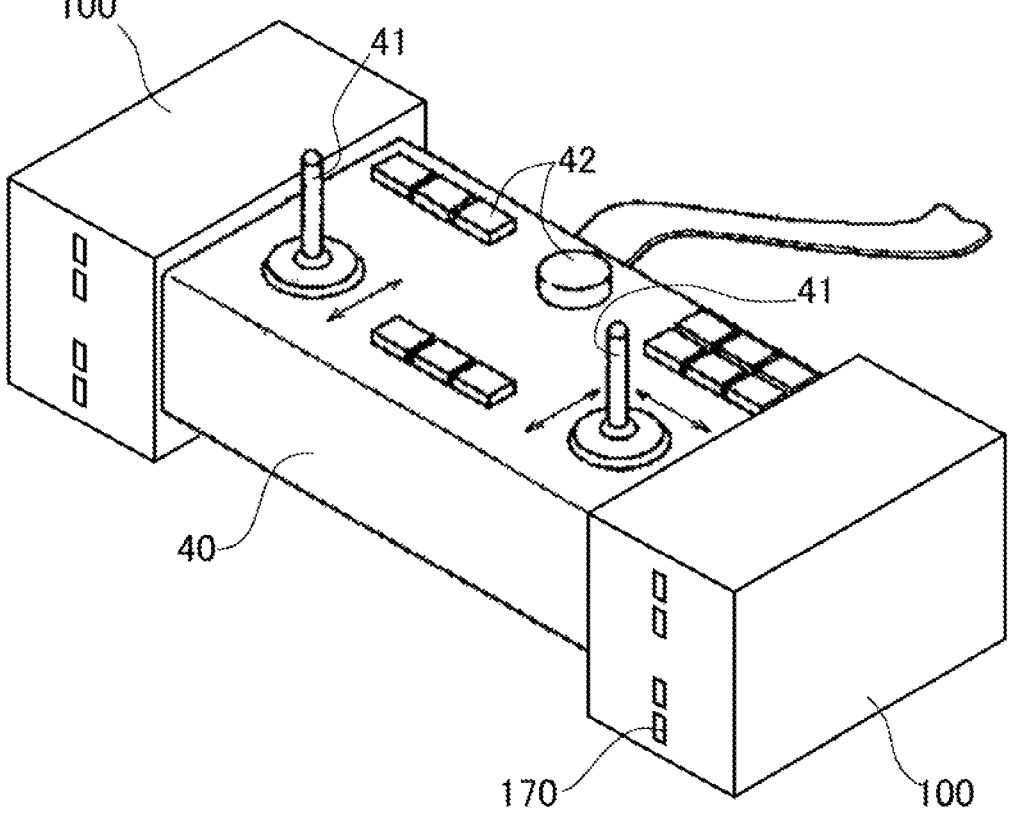
FIG. 13 is a diagram showing an example of the appearance of a controller.

FIG. 13 is a diagram showing an example of the appearance of the controller 40.

Figure 14:
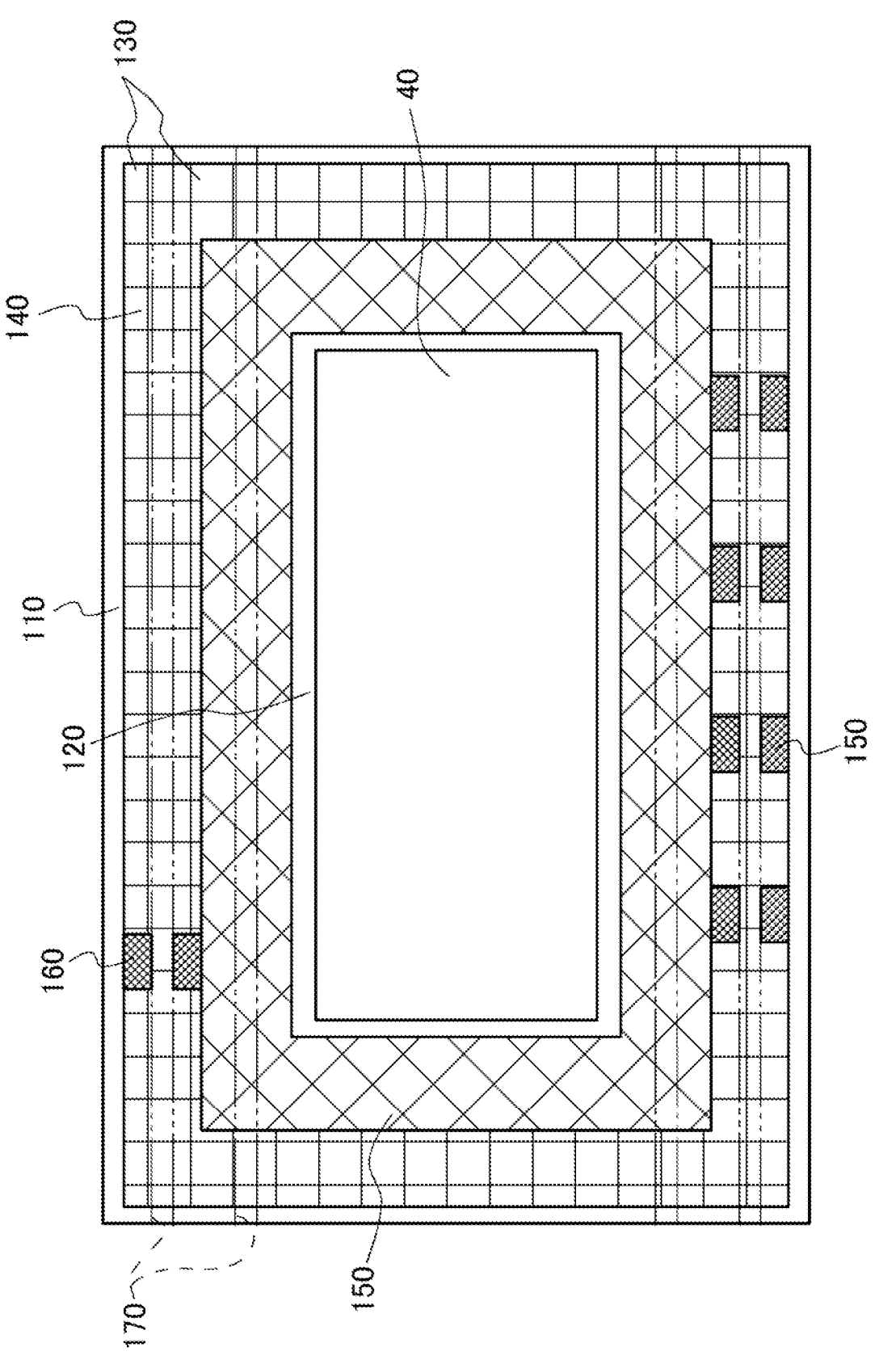
FIG. 14 is an example of a cross-sectional view of an attachment cover of the controller.

The controller 40 is provided with a joystick 41 and various buttons 42 as shown in FIG. 13. In recent years, the controller 40 is a touch panel type that does not have a joystick 41 or mechanical buttons 42. The attachment cover 100 may be attached to the controller 40. For example, an attachment cover to be attached to each side of the controller 40 may be manufactured. Although the heat insulation effect may not be necessary, the elasticity of the attachment cover to fit the hand and the distribution of elasticity according to the hand of each user makes the controller 40 easier to hold. FIG. 14 is an example of a cross-sectional view of the attachment cover 100 of the controller 40. As exemplified in FIG. 14, the attachment cover 100 has a layered structure, and each layer in the cross-sectional view denoted by the same reference sign as in the first embodiment.

The present invention is not limited to the above embodiment, and can be appropriately modified without departing from the scope of the present invention.

In the above embodiment, the intermediate layer 130 is exemplified as including two layers, but the intermediate layer 130 may include three or more layers.

When the intermediate layer 130 includes three or more layers, the layer of the intermediate layer 130 closest to the hand (the layer closest to the front face) may be considered to have a lower elastic modulus than the layer of the intermediate layer 130 closest to the measuring tool (the layer closest to the rear face).

(When the difference in elastic modulus is achieved by a difference in porosity, the layer of the intermediate layer 130 closest to the hand (the layer closest to the front face) may be considered to have higher porosity than the layer of the intermediate layer 130 closest to the measuring tool (the layer closest to the rear face). In addition, the layer of the intermediate layer 130 closest to the hand (the layer closest to the front face) may be considered to have lower thermal conductivity than the layer of the intermediate layer 130 closest to the measuring tool (the layer closest to the rear face).)

This is because as characteristics of the attachment cover that, first, the layer closest to the hand is important for determining the tactile sense and heat insulation, and second, the layer closest to the measuring tool is important for holding the measuring tool.

In this case, the elastic modulus, thermal conductivity, and porosity of the layer between the layer of the intermediate layer 130 closest to the hand (the layer closest to the front face) and the layer closest to the measuring tool (the layer closest to the rear face) are not particularly specified.

Alternatively, when the intermediate layer 130 includes three or more layers and two layers between the front face layer 110 and the rear face layer 120 are taken out, it may be considered that there is at least one set of layers in which the layer closer to the front face has a lower elastic modulus than the layer closer to the rear face. (When the difference in elastic modulus is achieved by a difference in porosity, the lower elastic modulus means that the porosity is higher. When the difference in thermal conductivity is achieved by a difference in porosity, the lower thermal conductivity means that the porosity is higher.) It is considered that the layer of this set closer to the hand determines the tactile sense and heat insulation and that the layer of this set closer to the measuring tool is important for holding the measuring tool.

When the intermediate layer 130 includes three or more layers, the most desirable structure is that when any two layers between the front face layer 110 and the rear face layer 120 are taken out as a set, the layer closer to the front face has a lower elastic modulus than the layer closer to the rear face (when the difference in thermal conductivity and elastic modulus is achieved by a difference in porosity, the porosity of the layer closer to the front face is higher) in each set.

REFERENCE SIGNS LIST

10 Micrometer
11 U-shaped frame
12 Anvil
13 Spindle
14 Thimble
15 Electronic unit
16 Display unit
20 Caliper
21 Main scale
22 Fixed-side jaw
23 Slider
24 Moving side jaw
30 Measuring machine
40 Controller
41 Joy stick
42 Button
100 Heat insulating cover
110 Front face layer
120 Rear face layer
130 Intermediate layer
140 First intermediate layer
150 Second intermediate layer
160 Fulcrum area
170 Ventilation hole
210 Manufacturer-end server
220 User terminal

The invention claimed is:

1. A measuring tool attachment cover capable of attaching to and detaching from a measuring tool to be hand-held by a user to perform a measurement work, wherein the measuring tool includes an outer surface having a gripping part contacting with a hand of the user gripping the measuring tool, the attachment cover is attached to the measuring tool to cover at least the gripping part, the attachment cover has a hollow structural part formed by a porous or a lattice structure, wherein the attachment cover has a front face contacting with the hand of the user and a rear face contacting with the measuring tool, the front face is constituted by a front face layer, the rear face is constituted by a rear face layer, a layer between the front face layer and the rear face layer is an intermediate layer, the front face layer and the rear face layer are compact layers with low porosity, and the intermediate layer is a hollow structural layer with larger porosity than the front face layer and the rear face layer, and wherein the hollow structural layer includes two or more layers with different elastic moduli, and a layer of the two or more layers closer to the front face has a lower elastic modulus than a layer closer to the rear face.

2. The measuring tool attachment cover according to claim 1, wherein the hollow structural layer includes two or more layers with different thermal conductivity, and a layer of the two or more layers closer to the front face has lower thermal conductivity than a layer closer to the rear face.

3. A measuring tool attachment cover capable of attaching to and detaching from a measuring tool to be hand-held by a user to perform a measurement work, wherein the measuring tool includes an outer surface having a gripping part contacting with a hand of the user gripping the measuring tool, the attachment cover is attached to the measuring tool to cover at least the gripping part, the attachment cover has a hollow structural part formed by a porous or a lattice structure, wherein the attachment cover has a front face contacting with the hand of the user and a rear face contacting with the measuring tool, the front face is constituted by a front face layer, the rear face is constituted by a rear face layer, a layer between the front face layer and the rear face layer is an intermediate layer, the front face layer and the rear face layer are compact layers with low porosity, and the intermediate layer is a hollow structural layer with larger porosity than the front face layer and the rear face layer, and wherein the hollow structural layer includes two or more layers with different thermal conductivity, and a layer of the two or more layers closer to the front face has lower thermal conductivity than a layer closer to the rear face.

4. A measuring tool attachment cover capable of attaching to and detaching from a measuring tool to be hand-held by a user to perform a measurement work, wherein the measuring tool includes an outer surface having a gripping part contacting with a hand of the user gripping the measuring tool, the attachment cover is attached to the measuring tool to cover at least the gripping part, the attachment cover has a hollow structural part formed by a porous or a lattice structure, wherein the attachment cover has a front face contacting with the hand of the user and a rear face contacting with the measuring tool, the front face is constituted by a front face layer, the rear face is constituted by a rear face layer, a layer between the front face layer and the rear face layer is an intermediate layer, the front face layer and the rear face layer are compact layers with low porosity, and the intermediate layer is a hollow structural layer with larger porosity than the front face layer and the rear face layer, and wherein the hollow structural layer includes two or more layers with different porosity, and a layer of the two or more layers closer to the front face has higher porosity than a layer closer to the rear face.

5. A measuring tool attachment cover capable of attaching to and detaching from a measuring tool to be hand-held by a user to perform a measurement work, wherein the measuring tool includes an outer surface having a gripping part contacting with a hand of the user gripping the measuring tool, the attachment cover is attached to the measuring tool to cover at least the gripping part, the attachment cover has a hollow structural part formed by a porous or a lattice structure, wherein the attachment cover has a front face contacting with the hand of the user and a rear face contacting with the measuring tool, the front face is constituted by a front face layer, the rear face is constituted by a rear face layer, a layer between the front face layer and the rear face layer is an intermediate layer, the front face layer and the rear face layer are compact layers with low porosity, and the intermediate layer is a hollow structural layer with larger porosity than the front face layer and the rear face layer, and wherein a direction from the rear face layer to the front face layer is a thickness direction, a direction orthogonal to the thickness direction is a width direction, the hollow structural layer has elastic modulus distribution in the width direction, and an elastic modulus of a certain area is different from an elastic modulus of an area surrounding the certain area.

6. The measuring tool attachment cover according to claim 5, wherein the elastic modulus distribution corresponds to a state of a hand of each user gripping the measuring tool, and an elastic modulus of an area contacting with the hand of the user is different from an elastic modulus of an area surrounding the hand-contact area.

7. A measuring tool attachment cover capable of attaching to and detaching from a measuring tool to be hand-held by a user to perform a measurement work, wherein the measuring tool includes an outer surface having a gripping part contacting with a hand of the user gripping the measuring tool, the attachment cover is attached to the measuring tool to cover at least the gripping part, the attachment cover has a hollow structural part formed by a porous or a lattice structure, wherein the attachment cover has a front face contacting with the hand of the user and a rear face contacting with the measuring tool, the front face is constituted by a front face layer, the rear face is constituted by a rear face layer, a layer between the front face layer and the rear face layer is an intermediate layer, the front face layer and the rear face layer are compact layers with low porosity, and the intermediate layer is a hollow structural layer with larger porosity than the front face layer and the rear face layer, wherein the intermediate layer is open to the outside through an opening provided in the front face layer, and wherein the hollow structural layer includes two or more layers with different thermal conductivity, and a layer of the two or more layers closer to the front face has lower thermal conductivity than a layer closer to the rear face.

8. A measuring tool attachment cover capable of attaching to and detaching from a measuring tool to be hand-held by a user to perform a measurement work, wherein the measuring tool includes an outer surface having a gripping part contacting with a hand of the user gripping the measuring tool, the attachment cover is attached to the measuring tool to cover at least the gripping part, the attachment cover has a hollow structural part formed by a porous or a lattice structure, wherein the attachment cover has a front face contacting with the hand of the user and a rear face contacting with the measuring tool, the front face is constituted by a front face layer, the rear face is constituted by a rear face layer, a layer between the front face layer and the rear face layer is an intermediate layer, the front face layer and the rear face layer are compact layers with low porosity, and the intermediate layer is a hollow structural layer with larger porosity than the front face layer and the rear face layer, wherein the intermediate layer is open to the outside through an opening provided in the front face layer, and wherein the hollow structural layer includes two or more layers with different porosity, and a layer of the two or more layers closer to the front face has higher porosity than a layer closer to the rear face.

\* \* \* \* \*